April 8, 1958 R. A. WHITE 2,830,178

PULSE FORMING CIRCUIT

Filed Jan. 8, 1954

INVENTOR
RICHARD A. WHITE
BY George Sipkin
[signature]
ATTORNEYS

United States Patent Office 2,830,178
Patented Apr. 8, 1958

2,830,178

PULSE FORMING CIRCUIT

Richard A. White, Horseheads, N. Y., assignor, by mesne assignments, to the United States of America as represented by the Secretary of the Navy Application January 8, 1954, Serial No. 403,083

6 Claims. (Cl. 250—27)

This invention relates to a pulse forming circuit and more particularly to a circuit for forming pulses which are suitable for modulating high power radio frequency waves.

Equipment for determining distances to reflecting objects by the measurement of the time delay between the emission of energy from a transmitter and the reception of the energy reflected from the object requires the operation, at high power levels, of ultra-high frequency oscillators such as magnetrons. The maximum average power level at which such oscillators may safely operate is limited, and it is common practice to operate the apparatus with high power levels for only brief periods, keeping the average power level within the limits of safety.

For the purpose of operating oscillators with high power levels for brief intervals, circuits are provided for delivering pulses of high power to the oscillators, the duration of the pulses constituting the time during which the oscillator operates, and the interval between the pulses constituting the time during which the oscillator is inoperative. In the past, pulse circuits or modulators which generate pulses by the rapid release of energy from pulse forming networks have been used. The time of release of the energy was controlled by complex vacuum tube timing circuits which usually included at least one phase shifting network for the correlation of the time of release with the current flow through the network. Such circuits had to be continually adjusted for proper time of release of the energy, the complexing triggering circuits were subject to many breakdowns and required considerable maintenance, and the circuits were often frequency sensitive.

It is an object of this invention to provide a new and improved pulse generator.

Another object of this invention is to provide a new and improved pulse generator which is suitable for use as a pulse modulator for high frequency oscillators and in which the time of modulation is automatically established.

A further object of this invention is to provide a new and improved modulator for high-frequency radio generators, which modulator produces high power pulses by the rapid release of energy from a pulse forming network, the time of release of said energy being positively controlled.

Other objects and advantages of the invention will hereinafter become more fully apparent from the following description of the annexed drawings, which illustrate a preferred embodiment, and wherein.

Figure 1:
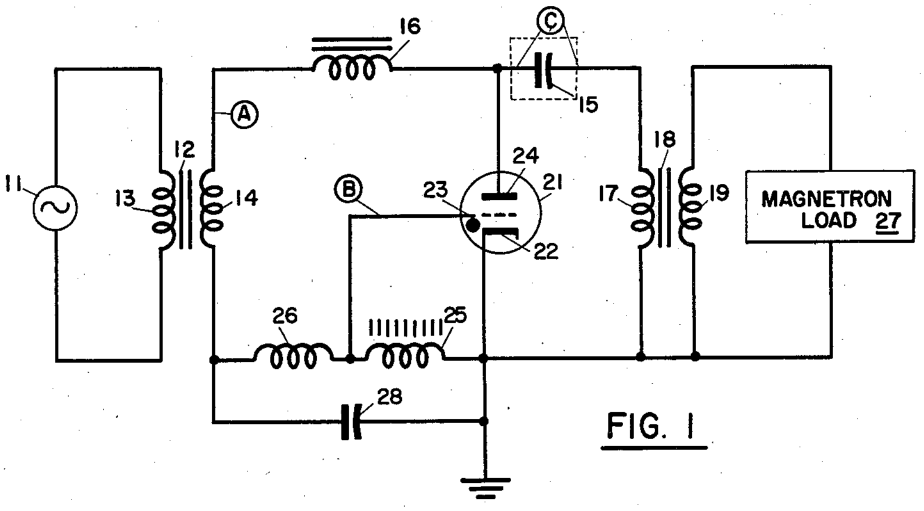
Fig.1 is a circuit diagram of the pulse generator of this invention.

Referring now to the drawings, the reference numeral 11 designates a source of alternating current which is connected to a primary winding 13 of a transformer 12. One end of a secondary winding 14 of the transformer 12 is connected through the winding of an inductance 16, to one side of a pulse forming apparatus shown as a single capacitor 15 for simplicity and to an anode 24 of a thyratron 21 which also comprises a control grid 23 and a cathode 22. The other side of the capacitor 15 is connected to one end of a primary winding 17 of a pulse transformer 18. The other end of the primary winding 17 of the pulse transformer 18 is connected to the cathode 22 of the thyratron 21, to one end of the winding of a saturable reactor 25, and to one side of a radio frequency by-pass capacitor 28. The other end of the winding of the saturable reactor 25 is connected to the control grid 23 of the thyratron 21 and to one end of a winding of a radio frequency choke 26. The other end of the winding of the radio frequency choke 26 is connected to the other end of the secondary 14 of the transformer 12 and to the other side of the radio frequency by-pass capacitor 28. A load 27, such as a high power magnetron used for radio-echo scanning, is connected to the secondary winding 19 of the transformer 18 to be energized thereby. The cathode 22 and one side of the secondary 19 are preferably grounded.

In operation, the alternating current source 11 induces an alternating current (see Fig. 2A) in the secondary 14. The capacitor 15 is charged by the current output of the secondary 14 and is preferably tuned by the inductor 16 to reduce the effect of its capacitive reactance upon the circuit. The saturable reactor 25 saturates at very low values of current, and when the current flow through the circuit comprising the capacitor 15, the primary 17 and the reactor 25 passes through zero, the high rate of change of flux in the winding of the reactor 25 induces a sharp pulse (see Fig. 2B) across the reactor 25.

The polarity of the pulse across the reactor 25 depends upon the direction in which the current is changing in the circuit. If the voltage pulse across the reactor 25 is such that the control grid 23 is negative with respect to the cathode 22, the pulse has no effect upon the conduction of the thyratron 21. However, when the voltage pulse across the reactor 25 is of such polarity that the control grid 23 is driven positive with respect to the cathode 22, the thyratron fires, presenting a very low impedance across the capacitor 15. When the thyratron 21 fires, it acts as a switch with the reactor 25 as an actuator therefore, the capacitor 15 rapidly discharging (see Fig. 2C) through the thyratron 21 and through the primary 17 of the output transformer 18 because of the low impedance of the two. This results in a high rate of change of flux in the transformer 18 inducing a pulse of high peak power in the secondary 19 and supplying the magnetron load 27 with energy.

Figure 2:
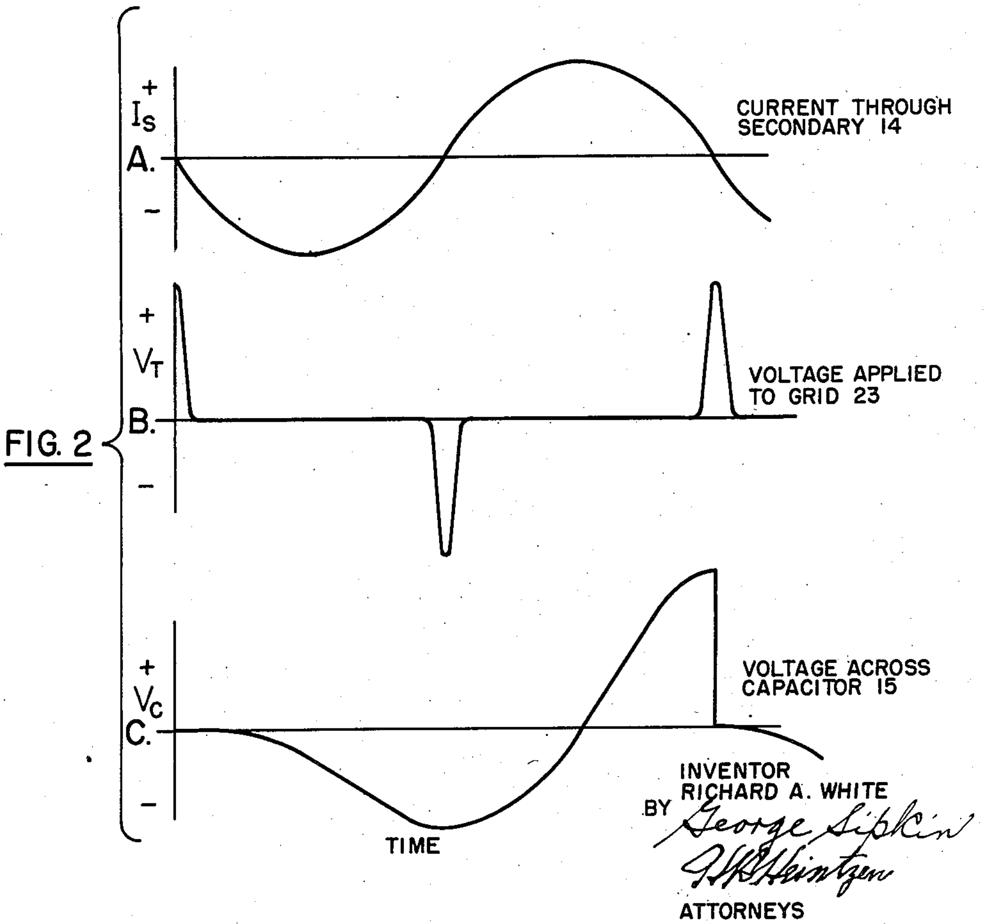
Fig. 2 is a series of curves representing the wave forms of the current and voltages at various points in the circuit of Fig. 1.

The curves of Fig. 2 show that, as the current in the secondary 14 passes from a negative value through zero to a positive value, a sharp negative pulse appears upon the thyratron grid 23. At this time, the capacitor 15 is charged to a peak negative value. That is, the voltage across the capacitor 15 is such that the anode 24 is negative. When the current flow through the secondary 14 changes direction, the capacitor 15 discharges slowly and charges in the opposite direction until the current through the secondary 14 changes from a positive value to zero, at which time the capacitor 15 is fully charged so that the anode 24 is positive. At the time the current through the secondary 14 passes from a positive value through zero, a sharp positive pulse is applied to the control grid 23 by the reactor 25, and the thyratron 21 fires, substantially short-circuiting the capacitor 15 through the primary 17. The rapid rate at which the capacitor 15 discharges through the thyratron 21 and the primary 17 is represented by the curve C of Fig. 2.

The use of a saturable reactor to control the time of discharge of the capacitor 15 ensures a simple device for triggering the thyratron 21 when the current through the capacitor is zero which is also the time when its charge is at a maximum. The timing device provides for the maximum transfer of power from the source 11 to the magnetron load 27.

If a pulse forming apparatus which is inductive is used instead of the capacitive apparatus 15 described herein, the tuning inductor 16 should be replaced by a tuning capacitor.

A saturable reactor which has been found satisfactory in the circuit of this invention was constructed of a sheet of magnetic alloy approximately 0.001 inch in thickness, spirally wound in the form of an annular core having an inside diameter of 1.5 inches, an outside diameter of 2.5 inches and a thickness of 0.5 inch. About this core approximately 150 turns of #18 wire were wrapped to form a toroidal coil.

Obviously many modifications and variations of the present invention are possible in the light of the above teachings. It is therefore to be understood that within the scope of the appended claims the invention may be practiced otherwise than as specifically described.

What is claimed is:

1. A pulse forming circuit comprising a pulse forming apparatus; means for connecting one side of said apparatus to one lead of a source of alternating voltage; an impedance having a first terminal and a second terminal, said first terminal being connected to the other side of said apparatus; a saturable reactor having a reactor winding; one end of said reactor winding being connected to said second terminal; means for connecting the other end of said reactor winding to another lead of said source of alternating voltage; said source of alternating voltage when so connected causing alternating current to flow through said apparatus, said impedance and said reactor winding; and a gas-filled electron tube comprising an anode, a cathode and a control grid; said anode being connected to said one side of said apparatus; said cathode being connected to said second terminal of said impedance; and said control grid being directly connected to said other end of said reactor winding; said reactor winding inducing within itself upon said current becoming substantially zero from a positive value between alternations in the flow thereof, a positive voltage pulse which is applied to said control grid to fire said electron tube.

2. The pulse forming circuit defined in claim 1 wherein said impedance comprises an inductor.

3. The pulse forming circuit defined in claim 1 wherein said impedance comprises a transformer having a primary winding and a secondary winding, said primary winding being connected at one end to said first terminal and at its other end to said second terminal, and further including a load, said load being connected across said secondary winding.

4. A pulse forming circuit comprising a pulse forming apparatus, a first inductor being connected at one end to one side of said apparatus to tune said apparatus; means for connecting the other end of said first inductor to one lead of a source of alternating voltage; a transformer having a primary winding and a secondary winding; said primary winding being connected at one end to the other side of said apparatus; a saturable reactor having a reactor winding, said reactor winding being connected at one end to the other end of said primary winding; a second inductor comprising a radio frequency choke coil; said choke coil being connected at one end to the other end of said reactor winding; means to connect the other end of said choke coil to another lead of said source of alternating voltage; said source of alternating voltage when so connected causing alternating current to flow through said first inductor, said apparatus, said primary winding, said reactor winding and said choke coil; a gas-filled electron tube comprising an anode, a cathode and a control grid; said anode being connected to said one side of said apparatus, said cathode being connected to said other side of said primary winding, and said control grid being directly connected to said other side of said reactor winding; and a radio frequency by-pass capacitor connected across said reactor winding and said choke coil.

5. The pulse forming circuit defined in claim 4 further including a load, said load being connected across said secondary winding.

6. In a resonant charging pulse generator, a charge storing pulse forming network, a linear inductance, and a pulse transformer having a primary winding, said primary winding being connected in series with said network and the linear inductance to form a resonant circuit, means for charging to a positive value said network through said resonant circuit, a thyratron tube having a cathode, a grid, and an anode, and having positive control-grid characteristics, the cathode and the anode of said tube being connected in parallel with said primary winding and said network, a peaking reactor having a reactor winding, said reactor winding being connected in the path of the charging current, one end of said reactor winding being connected to the cathode of said tube, and means connecting the other end of said reactor winding directly to the grid of said tube, said last-mentioned means constituting the sole connection to the grid of said tube, the working being such that the positive voltage pulse induced in said reactor winding when the charging current becomes substantially zero from a positive value triggers the thyratron tube.

References Cited in the file of this patent

UNITED STATES PATENTS

| | | |
|---|---|---|
| 2,391,894 | Gorham et al. | Jan. 1, 1946 |
| 2,419,201 | Crump et al. | Apr. 22, 1947 |
| 2,514,413 | Pawley | July 11, 1950 |
| 2,625,652 | Krulikoski et al. | Jan. 13, 1953 |
| 2,674,691 | Krulikoski et al. | Apr. 6, 1954 |
| 2,739,233 | Clayton | Mar. 20, 1956 |